UNITED STATES PATENT OFFICE.

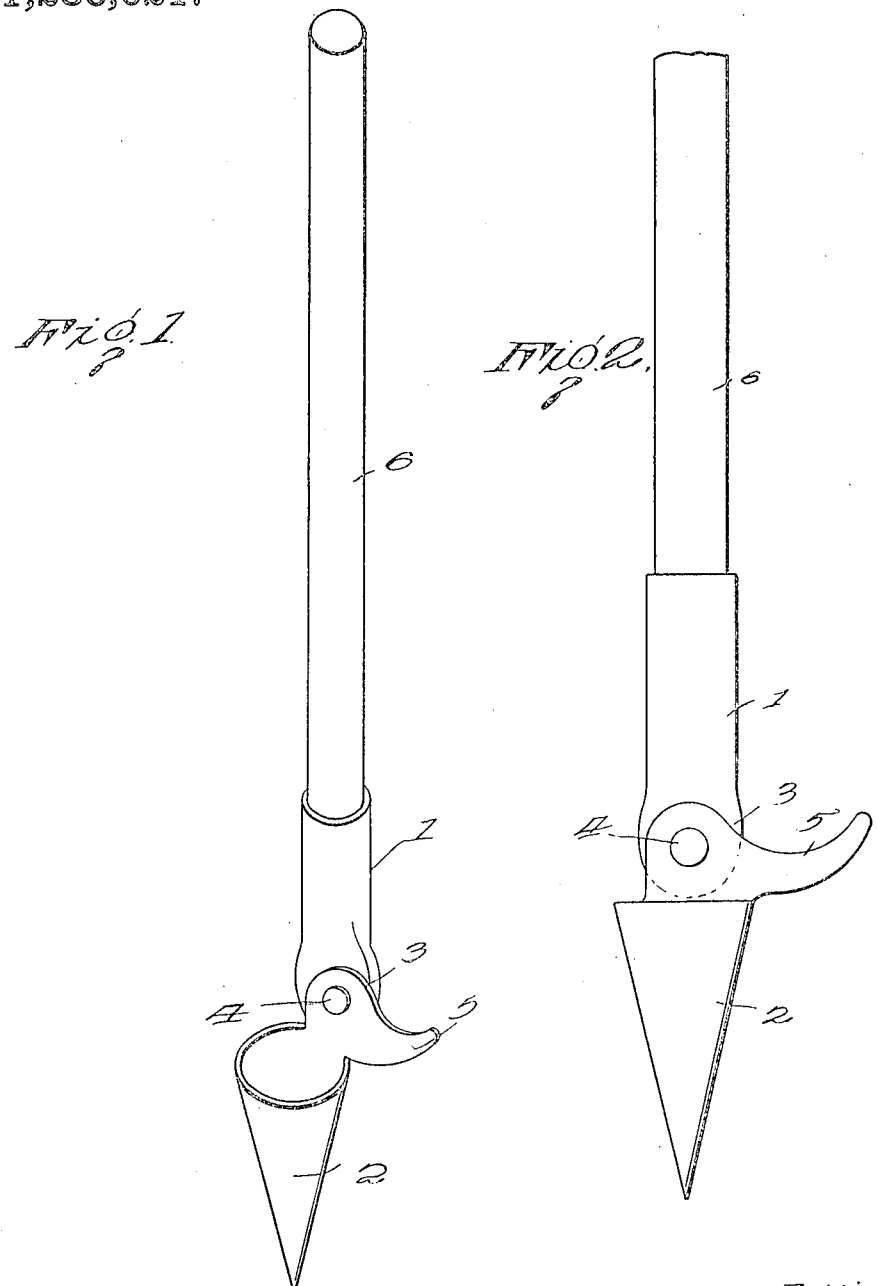

HERMAN E. KIRN, OF CHINOOK, MONTANA.

RODENT-EXTERMINATING IMPLEMENT.

1,286,021.  Specification of Letters Patent.  Patented Nov. 26, 1918.

Application filed July 2, 1917. Serial No. 178,213.

*To all whom it may concern:*

Be it known that I, HERMAN E. KIRN, a citizen of the United States, and resident of Chinook, in the county of Blaine and State of Montana, have invented certain new and useful Improvements in Rodent-Exterminating Implements, of which the following is a specification.

This invention relates to rodent exterminating devices; the primary object of the invention being to provide an implement for receiving and discharging poison into the holes or burrows of rodents, the implement being forced downwardly into the earth and then removed in a manner to cause the discharge of poison from the same into the hole or burrow.

Among other aims and objects of the invention may be recited, the provision of an implement of the character mentioned with a view to compactness and in which the number of parts are few, the construction simple, the cost of production small, and efficiency of operation.

In order that the invention and its manner of application may be readily understood by those skilled in the art, I have in the accompanying illustrative drawings and in the detailed following description based thereon set forth the preferred embodiment of the invention.

In the drawing:

Figure 1 is a perspective of the improved implement, and

Fig. 2 is a side elevation thereof.

Having reference to the drawings, wherein like reference characters designate corresponding parts throughout the several views, 1 designates a socket, the lower end of which is flattened and provided with an opening whereby a substantially conical cup 2 having an apertured ear 3 formed upon one side thereof may be pivotally connected to the socket by means of a pin or rivet 4. As will be noted, the ear 3 is provided with a laterally extending finger 5 which finger serves in the capacity of a trip during the placing of poison or like matter in the hole or burrow of a rodent.

A handle 6 is provided and is inserted in the socket 1, obviously serving to facilitate the embedding of the cup 2 in earth.

In operation, poisoned grain or like stuff is placed in the conical cup 2 and with the cup in the position as shown in the figures of the drawings the device is then forced downwardly into the earth, that is, the burrow or hole of the rodent. With the device sufficiently embedded the handle 6 is forced to one side and pulled upwardly. Such action will engage the finger 5 with the earth and obviously cause the tripping of the conical cup 2 due to its pivotal mounting on the socket 1, thus, discharging its contents into the burrow or hole.

From the foregoing, it will be appreciated by workers in the art that with my improved rodent exterminating implement, poisoned grain and like stuff can be placed directly in the burrows or holes of rodents and not strewn over the surface of the ground, thereby endangering the lives of stock and other creatures, especially bird life.

Manifestly, the construction shown is capable of considerable modification, and such modification as is within the scope of my claims, I consider within the spirit of my invention.

I claim:

1. A rodent exterminating implement, including a handle, a cup pivoted to one end of said handle, and means on said cup for causing the inverting of the same when engaged in an opening.

2. A rodent exterminating implement, including a handle, a cup pivoted to one end of said handle, and a laterally extending finger formed integral with the upper portion of said cup adjacent its pivotal connection for causing the inverting of the same when engaged in an opening.

In testimony whereof, I affix my signature hereto.

HERMAN E. KIRN.

Copies of this patent may be obtained for five cents each, by addressing the "Commissioner of Patents, Washington, D. C."